US011987943B1

(12) United States Patent
Reckert et al.

(10) Patent No.: US 11,987,943 B1
(45) Date of Patent: May 21, 2024

(54) TRAFFIC MARKER ILLUMINATION DEVICE

(71) Applicant: Safety X Enterprises, LLC, Clayton, NC (US)

(72) Inventors: Peter A. Reckert, Cary, NC (US); David Alton Chamblee, Raleigh, NC (US); Tristan Tyler Neal, Clayton, NC (US); Bobby Dayle Price, Cary, NC (US)

(73) Assignee: Safety X Enterprises, LLC, Clayton, NC (US)

( * ) Notice: Subject to any disclaimer, the term of this patent is extended or adjusted under 35 U.S.C. 154(b) by 0 days.

(21) Appl. No.: 18/504,506

(22) Filed: Nov. 8, 2023

Related U.S. Application Data

(60) Provisional application No. 63/382,767, filed on Nov. 8, 2022.

(51) Int. Cl.

| | |
|---|---|
| ***E01F 9/615*** | (2016.01) |
| ***F21L 4/08*** | (2006.01) |
| ***F21V 23/00*** | (2015.01) |
| ***F21V 23/04*** | (2006.01) |

(52) U.S. Cl.
CPC ................ *E01F 9/615* (2016.02); *F21L 4/08* (2013.01); *F21V 23/004* (2013.01); *F21V 23/0464* (2013.01); *F21V 23/0471* (2013.01)

(58) Field of Classification Search
CPC ........... E01F 9/615; F21L 4/08; F21V 23/004; F21V 23/0464; F21V 23/0471
See application file for complete search history.

(56) References Cited

U.S. PATENT DOCUMENTS

| | | | | |
|---|---|---|---|---|
| 3,952,690 | A | | 4/1976 | Rizzo |
| D279,275 | S | | 6/1985 | Cory |
| 5,201,599 | A | | 4/1993 | Kulp |
| 5,294,924 | A | * | 3/1994 | Dydzyk .................. E01F 9/688 340/471 |
| 5,342,140 | A | | 8/1994 | Glass |
| 5,451,118 | A | | 9/1995 | Wilkins |
| 5,570,972 | A | | 11/1996 | Glass |
| 5,722,788 | A | | 3/1998 | Bent |
| 5,753,347 | A | | 5/1998 | Baker |
| 5,755,174 | A | | 5/1998 | Freeman |
| D406,543 | S | | 3/1999 | Brown |
| 6,019,542 | A | | 2/2000 | Bent |
| 6,182,600 | B1 | | 2/2001 | Brown |
| D440,173 | S | | 4/2001 | Cuttill |
| 6,556,147 | B1 | | 4/2003 | Fisher |
| D485,775 | S | | 1/2004 | Smith |
| 6,753,762 | B1 | * | 6/2004 | Jorba Gonzalez ........ B64F 1/20 340/331 |
| 6,786,673 | B2 | | 9/2004 | Kulp |
| 6,817,805 | B2 | | 11/2004 | Mettler |
| 7,876,237 | B2 | | 1/2011 | Chen |

(Continued)

*Primary Examiner* — Gary C Hoge
(74) *Attorney, Agent, or Firm* — NK Patent Law

(57) ABSTRACT

A traffic marker illumination device for improving the visibility of a traffic marker to provide warnings for constructions sites and roadways. The traffic marker illumination device is designed to removably attach to an interior portion of a traffic marker. The traffic marker illumination device generates a light to illuminate the traffic marker based on the geographic position of the traffic marker and surrounding environmental elements.

20 Claims, 11 Drawing Sheets

(56) References Cited

U.S. PATENT DOCUMENTS

| | | | | |
|---|---|---|---|---|
| 7,997,764 | B1 * | 8/2011 | Nielson | E01F 9/688 362/183 |
| 8,070,380 | B2 | 12/2011 | Pucillo | |
| 8,794,172 | B2 | 8/2014 | Bromm | |
| 8,851,706 | B2 | 10/2014 | AlSaffar | |
| 9,127,420 | B2 | 9/2015 | Ko | |
| D749,443 | S | 2/2016 | Knighten | |
| 9,437,109 | B1 * | 9/2016 | Stafford | B60Q 7/00 |
| 9,863,578 | B2 | 1/2018 | Cuttill | |
| 10,487,464 | B2 | 11/2019 | Rich | |
| D937,699 | S | 12/2021 | Wang Lee | |
| 11,276,337 | B1 | 3/2022 | Yavruyan | |
| 2009/0195412 | A1 * | 8/2009 | Chen | E01F 9/615 340/908 |
| 2010/0265699 | A1 * | 10/2010 | Nielson | E01F 9/615 362/183 |
| 2013/0214924 | A1 * | 8/2013 | Ko | H05B 47/105 340/522 |
| 2014/0015692 | A1 | 1/2014 | Sun | |
| 2017/0198447 | A1 * | 7/2017 | Tanoury | E01F 9/615 |
| 2019/0161926 | A1 | 5/2019 | Wiesen | |
| 2021/0305689 | A1 * | 9/2021 | Leizerovich | H01Q 21/28 |
| 2021/0348346 | A1 | 11/2021 | Koyle | |

* cited by examiner

PRIOR ART FIG. 1

TRAFFIC MARKER ILLUMINATION DEVICE

CROSS-REFERENCE TO RELATED APPLICATIONS

This application claims priority to and the benefit of U.S. Provisional Patent Application No. 63/382,767 filed on Nov. 8, 2022, titled "TRAFFIC MARKER ILLUMINATION DEVICE," the contents of which is incorporated herein by reference in its entirety.

BACKGROUND

Traffic markers (e.g., cones and barrels) are used in all environmental conditions to direct traffic away from dangers, into desired traffic lines, and to indicate the presence of workers. In order to effectively work, traffic markers must be visible in all conditions and times of the day while withstanding the environmental elements.

FIELD OF THE INVENTION

The present invention is generally directed to traffic markers, and more specifically to a traffic marker illumination device.

DESCRIPTION OF RELATED ART

Current devices and methods of lighting up construction sites include standalone lights, lighting devices attached to the external part of a traffic marker, and traffic barrels with built-in lights. However, these lighting devices and traffic barrels are not easily attached to the interior of a barrel nor do these devices provide a timing component designed to a lighting component.

Prior art patent documents include the following:

U.S. Pat. No. 10,487,464 for traffic cone by inventor Steven Rich, filed Aug. 13, 2017 and issued Nov. 26, 2019, is directed to a modular traffic cone assembled from a flat sheet and a dish that stores in a minimum of space. In one embodiment, translucent traffic cone has enhanced visibility through a light seated on a platform inside the translucent cone. In one embodiment, the modular traffic cone is included in a traffic directing kit comprising a translucent flat sheet, a dish and a platform, the sheet, the dish and the platform forming the traffic cone. The kit may also include ballast and the light for seating inside the traffic cone.

U.S. Pat. No. 9,127,420 for intelligent construction cone by inventor Chien-Ho Ko, filed Aug. 23, 2012 and issued Sep. 8, 2015, is directed to an intelligent construction cone that includes a light pervious body rotatable relative to a body. A rotating device is mounted to the light pervious body and driven by a driving device to rotate the light pervious body. A distance detector sends a distance signal to a controller coupled to the driving device. The distance detector is jointly rotatable with the light pervious body to eliminate detection dead angle. A warning device is coupled to the controller and generates a warning message responsive to the distance signal. A lighting device is coupled to the controller and provides illumination. A light sensor and a humidity sensor are coupled to the controller and detect environmental brightness and environmental humidity, respectively. The warning message and intensity of the illumination are adjusted according to a distance between an object and the distance detector, the environmental brightness, and the environmental humidity.

US Patent Publication No. 2019/0161926 for life saver device and method by inventor Bryan Wiesen, filed Nov. 8, 2018 and published May 30, 2019, is directed to a life saver device that includes a traffic cone having an internal volume, a bottom closure panel, a rechargeable battery and at least one light and may further comprise an internal volume with a bottom closure panel to house a rechargeable battery for powering at least one light; and is configured to provide a portable, rechargeable, illuminated traffic safety alert signal.

U.S. Pat. No. 11,276,337 for systems and methods for an intelligent safety and warning cone by inventor Ara Yavruyan, filed Nov. 25, 2020 and issued Mar. 15, 2022, is directed to an intelligent cone comprising a base, a cone section, at least one light, a 360 degree motion sensing system, a fan, and at least one hardware processor, and one or more software modules that are configured to, when executed by the at least one hardware processor, receive information from the sensing system indicating that a person is approaching the intelligent cone, activate the at least one light as a warning to the approaching person, and operate the fan to dry a spill or moisture that is creating a safety issue.

U.S. Pat. No. 7,876,237 for a road cone by Ming-Chang Chen, filed May 16, 2008, and published Aug. 6, 2009, is directed to a road cone including a hollow truncated conical body having a top open end defining a top opening; a power supplying unit mounted detachably in the truncated conical body and accessible through the top opening; a cap mounted on the top open end of the truncated conical body and covering the top opening of the truncated conical body; and a light emitting unit mounted in the truncated conical body and connected electrically to the power supplying unit so as to be powered by the power supplying unit to generate light inside the truncated conical body.

U.S. Pat. No. 6,753,762 for signalling beacon by inventor Jose Jorba Gonzalez, filed Sep. 2, 1999, and issued Jun. 22, 2004, is directed to a signalling beacon comprised of a lighting indicator which is mounted in a body enabling the stacking thereof. An energy accumulation device, at least one photovoltaic cell and an electronic device of the beacon are in the beacon. The electronic device has a radio frequency receiver circuit to receive radio communication signals which are emitted by an emitter circuit, and a light indicator control circuit. The light indicator control circuit includes a timer, a logic circuit intended to the polarization of the timer and of the light indicator, and a connection device for the switching off of the energy accumulation device when the beacons are piled up. A signalling beacon is obtained with a high autonomy, which is also remotely controllable and it has a high versatility of applications.

U.S. Pat. No. 6,556,147 for pylon with internal lighting by inventors Fisher, et al., filed Aug. 8, 2000, and issued Apr. 29, 2003.

U.S. Pat. No. 5,755,174 for traffic safety control security system and method by inventor Donald H. Freeman, filed May 21, 1996, and issued May 26, 1998, is directed to a traffic safety control security system. Warning lights, signs, and warning flags are connected and secured to the tops of standard traffic cones either with or without the use of cone adapters. One end of a stainless steel aircraft cable connects directly to the traffic control accessories, while the other end of the cable is secured by a removable security disc and padlock within the traffic cone. Interconnecting the accessory and traffic cone together prevents injury to vehicles or individuals nearby if a traffic cone is accidentally struck by a vehicle, or encounters violent weather, causing the accessory to fly loose as a projectile. In addition a chain can now interconnect traffic cones in the system together, preventing theft of the traffic cones and/or accessories. Set up and knock down of the system is consistent with customary traffic safety control procedures.

U.S. Pat. No. 8,851,706 for lighted road cone by inventor Abdulreidha Abdulrasoul Alsaffar, filed Oct. 11, 2012, and issued Oct. 7, 2014, is directed to a lighted road cone has a base and an elongate hollow pyramidal body having a plurality of faces extending upward from the base. A column of lights is disposed on each face of the pyramidal body, the lights extending from proximate the base upward to proximate a top portion of the hollow body. A controller turns the lights on and off. Preferably, each column has a pair of red lights near the base of the device, an intermediate pair of blue lights disposed upward from the red lights, and then a pair of red lights disposed upward from the blue lights. A top dome light may be disposed on the top of the hollow body. The lights may be prismatic in shape. Alternatively, the lights may be arranged in polygonal layers that circumscribe the pyramidal body.

U.S. Pat. No. 7,997,764 for flashing light module for a traffic safety cone by inventor Lewis A. Nielson, filed Feb. 28, 2010, and issued Aug. 16, 2011, is directed to a flashing light module for a traffic safety cone has multiple stacked arrays of LED lights providing 360-degree visibility around the cone. The LED arrays are mounted onto a battery container, and a transparent or translucent housing covers the arrays and mounts onto the battery container to provide a water-tight seal for the enclosed electronics. The battery container fits into the upper opening in a truncated traffic safety cone. The LED light arrays have a variable flash rate. Optionally, an ambient light sensor is used to control the intensity of the light produced by the LED lights.

US Patent Publication No. 2014/0015692 for traffic cone assembly by inventor Yueh-Che Sun, filed Jul. 12, 2012, and published Jan. 16, 2014, is directed to a traffic cone assembly including a base, a telescopic unit and an illuminating unit. The base has an inner space and a base hole formed through a top surface of the base. The telescopic unit is capable of telescoping longitudinally, is securely connected with the base and has a bottom, a middle and a top. The bottom of the telescopic unit is securely mounted in the inner space of the base. The middle of the telescopic unit protrudes out from the base hole. An LED (light emitting diode) of the illuminating unit is securely mounted on the top of the telescopic unit. Because the LED mounted on the top of the telescopic unit can illuminate, the traffic cone assembly can be seen with good visibility.

US Patent Publication No. 2021/0348346 for cone attachment device by inventor Roger D. Koyle, filed Nov. 1, 2019, and published Nov. 11, 2021, is directed to a traffic cone attachment system including a top disc positioned against an opening in a top of a traffic cone. The traffic cone attachment system may include a shaft coupled to the top disc, the shaft spanning the opening in the top of the traffic cone and extending in a vertical direction. A washer may be disposed around the shaft and positioned on an opposite side of the opening from the top disc. The traffic cone attachment system may include a star lock disposed around a length of the shaft such that the washer is interposed between the opening and the star lock. A traffic cone attachment device may be coupled to the traffic cone attachment system. A traffic cone system may include a plurality of traffic cones, each traffic cone of the plurality including a traffic cone attachment system and a traffic cone attachment device.

US Patent Publication No. 2017/0198447 for safety cone with controlled illumination by inventors Peter Tanoury, et al., filed Jan. 12, 2016, and issued Sep. 26, 2017, is directed to a safety or sports cone with controlled illumination that is durable and easy to use. The cone has a light-transmitting body with an illumination device housing integrated into the top of the body that houses an illumination device that rests on a support ring and is accessed by a housing cap. The illumination device includes a light-emitting diode (LED) module, an LED actuator, a battery, and a battery housing. The illumination device is covered by a protective transparent shell. A reflective platform increases the illumination intensity at the top of the cone and provides additional protection from physical damage and contaminants. The illumination is activated and deactivated by pressing the center of the housing cap to affect the LED actuator. One or more ridges extending from the inner surface of the body below the support ring prevent unwanted activation of the illumination device during cone stacking.

SUMMARY OF THE INVENTION

In one embodiment, the present invention includes a traffic marker illumination device configured to improve the visibility of a traffic marker.

In another embodiment, the present invention includes a traffic marker illumination device configured to attach to an interior portion of a base of a traffic marker.

In yet another embodiment, the present invention includes a traffic marker illumination device comprising a plurality of LED lights configured to attach to the interior portion of a base of a traffic barrel.

In some embodiments, the traffic marker illumination device includes a top shell, a bottom shell, a magnetic insert, a first gasket, a second gasket, at least one battery, a layer of heat-dissipating material, a printed circuit board assembly including at least one processor, at least one antenna, and a light emitting component, and at least one glass lens. The traffic marker illumination device is operable to magnetically attach to a corresponding magnet positioned on a traffic marker via the magnetic insert. The light emitting component is operable to generate a light corresponding to a lighting sequence. The light lighting sequence is based on a timing schedule and a location of the traffic marker illumination device.

In some embodiments, the traffic marker illumination device includes at least one sensor. The at least one sensor includes at least one of a temperature sensor, an optical sensor, a global positioning sensor, and/or a movement sensor. The optical sensor is designed to detect a presence of sunlight and/or an amount of sunlight and is in network communication with the at least one processor. Based on the presence of sunlight and/or the amount of sunlight, the at least one processor is operable to activate the light emitting component. The light emitting component includes a plurality of light emitting diodes. The lighting sequence further includes a color of a light generated by the light emitting component. The traffic marker illumination device further includes a wireless charging coil operable to charge the at least one battery. In some embodiments, the traffic marker illumination device includes at least one solar cell designed to charge the at least one battery.

In some embodiments, the traffic marker illumination device includes a top shell, a bottom shell, a magnetic layer, a first gasket, a second gasket, at least one battery, at least one sensor, a printed circuit board assembly including at least one processor, at least one antenna, and a light emitting component, and at least one glass lens. The light emitting component includes a plurality of light emitting diodes. The magnetic insert is positioned under the top shell, the first gasket is positioned under the magnetic insert, the at least one battery and the printed circuit board assembly are positioned below the first gasket, the glass lens is positioned underneath the printed circuitry board assembly, the second gasket is positioned underneath the printed circuit board assembly, and the bottom shell is positioned underneath the second gasket.

In some embodiments, the traffic marker illumination device is operable to magnetically attach to a corresponding magnet positioned on a traffic marker. The traffic marker illumination device is further operable to receive at least one command from at least one remote device. The at least one command includes a power command. The power command includes an activation of the traffic marker illumination device or a deactivation of the traffic marker illumination device. In some embodiments, the at least one command includes a lighting sequence including a timing and a color of a light generated by the light emitting component. The generated light includes at least one of a constant light, a pulsing light, and/or a strobe light. In some embodiments, the traffic marker illumination device is in network communication with at least one remote device and includes a movement sensor. The movement sensor (e.g., accelerometer, gyroscope) is operable to collect position data and movement data of the traffic marker illumination device. The movement sensor is operable to generate an alert when the position data and movement data indicates that the traffic marker illumination device is flipped or dropped. In some embodiments, the traffic marker illumination device includes a top shell and a bottom shell including an anodized metal material.

In some embodiments, a traffic marker illumination device includes a top shell, a bottom shell, a magnetic layer, a first gasket, a second gasket, a plurality of sensors including at least one optical sensor, at least one positioning sensor, and/or at least one temperature sensor, at least one battery, a printed circuit board assembly including at least one processor, at least one antenna, and a light emitting component, and at least one glass lens. The traffic marker illumination device is operable to attach to an interior surface of a traffic marker. Once positioned within the interior of the traffic marker, the traffic marker illumination device is operable to generate a light via the light emitting component.

In some embodiments, the traffic marker illumination device is in network communication with at least one remote device. The traffic marker illumination device is operable to receive a lighting schedule including a time and lighting sequence corresponding to a light generated by the light emitting component. In some embodiments, the lighting schedule is updated in real-time based on positioning data captured by the at least one position sensor. The lighting schedule is based on a sunset time and a sunrise time. In some embodiments, the at least one optical sensor is designed to detect sunlight. The at least one processor is operable to activate the light emitting component according to the lighting schedule based on the detection of sunlight. In some embodiments, the traffic marker illumination device includes a wireless charging coil designed to provide power to the at least one battery. In some embodiments, the traffic marker illumination device attaches to an interior of a traffic marker via the magnetic insert and a corresponding magnet positioned on the traffic marker. In some embodiments, the traffic marker illumination device further includes a heatsink attached to the printed circuit board assembly. In some embodiments, the traffic marker illumination device is operable for network communication with a second traffic marker illumination device. The second traffic marker illumination device is operable to generate a light based on the light generated by the first traffic marker illumination device.

In some embodiments, a traffic marker illumination device for improving the safety and signals of traffic markers is disclosed. The traffic marker illumination device is a retrofittable device for existing traffic markers. The traffic marker illumination device creates a highly visible object with controllable light and color sequencing. Advantageously, the traffic marker illumination device is operable for real-time provisioning, tracking, and control for large construction and traffic projects (e.g., highways, sporting events, emergencies, law enforcement).

In some embodiments, a traffic marker illumination device with a plurality of light-emitting diodes (LEDs) is disclosed for illuminating traffic markers (e.g., traffic cones). The traffic marker illumination device is operable for nighttime and low-light environments where traffic markers are typically less visible.

In some embodiments, a traffic marker illumination system including at least one traffic marker illumination device and a software platform including a mobile application is disclosed. The software platform is operable to display the mobile application via a user interface of a remote device. The software platform is operable to receive a real-time location of the traffic marker illumination device and to display the real-time location via the user interface of the remote device. Advantageously, the software platform is operable to track and monitor a plurality of traffic marker illumination devices.

In some embodiments, the traffic marker illumination device is designed for near-field communication (NFC) using a NFC tag with a unique identifier. The traffic marker illumination device is designed to be correlated with a user account via the NFC tag and software platform. Advantageously, a plurality of traffic illumination devices is operable to be paired with a user account. In some embodiments, the traffic marker illumination device is designed for low-power cellular communication (e.g., narrowband Internet of Things, Low Power Wide Area Networking (LoRaWAN)) and positioning tracking (e.g., global navigation satellite system) to provide real-time control and monitoring for illumination of one or more traffic marker illumination devices.

In some embodiments, the traffic marker illumination device includes an adjustable mounting brace. The adjustable mounting brace extends from the body of the traffic marker illumination device until it comes into contact with an interior wall of the traffic marker. The mounting brace includes a ribbed surface designed to hold the traffic marker illumination device in place.

In some embodiments, the traffic marker illumination device includes a multicolor, dimmable LED array with a luminosity range between about 4,000 lumen to about 100,000 lumen. Advantageously, the light and color of each traffic marker illumination device is customizable to indicate caution, routing, signals, and other messages. In some embodiments, the traffic marker illumination device includes a plurality of rechargeable batteries. Alternatively, or additionally, the traffic marker illumination includes a solar power module designed to power the at least one battery using a solar cell.

In some embodiments, the traffic marker illumination device includes a battery charging and management circuit for fast charging, charge estimation, input current limit, charge current and battery voltage regulation, and thermal regulation. The traffic marker illumination device further includes a programmable LED driver for control and dimming of a LED array. The traffic marker illumination device further includes an NFC tag and an antenna for real-time identification and diagnostics.

BRIEF DESCRIPTION OF THE SEVERAL VIEWS OF THE DRAWINGS

The embodiments illustrated, described, and discussed herein are illustrative of the present invention. As these embodiments of the present invention are described with reference to illustrations, various modifications, or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
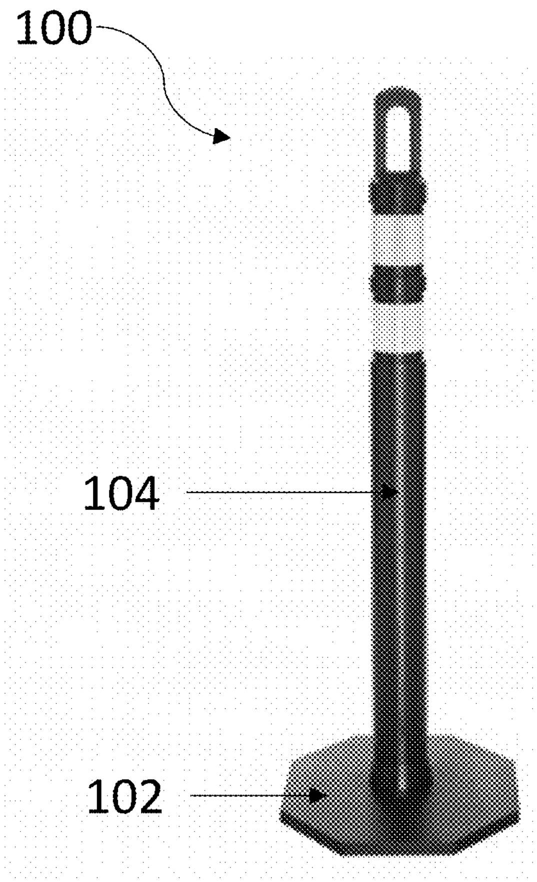
FIG. 1 illustrates a prior art traffic marker.

For the purposes of promoting an understanding of the present disclosure, reference will be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Articles "a" and "an" are used herein to refer to one or to more than one (i.e., at least one) of the grammatical object of the article. By way of example, "a composite" means at least one composite and can include more than one composite.

Throughout the specification, the terms "about" and/or "approximately" may be used in conjunction with numerical values and/or ranges. The term "about" is understood to mean those values near to a recited value. For example, "about 40 [units]" may mean within +/−25% of 40 (e.g., from 30 to 50), within +/−20%, +/−15%, +/−10%, +/−9%, +/−8%, +/−7%, +/−6%, +/−5%, +/−4%, +/−3%, +/−2%, +/−1%, less than +/−1%, or any other value or range of values therein or there below. Furthermore, the phrases "less than about [a value]" or "greater than about [a value]" should be understood in view of the definition of the term "about" provided herein. The terms "about" and "approximately" may be used interchangeably.

As used herein, the verb "comprise" as is used in this description and in the claims and its conjugations are used in its non-limiting sense to mean that items following the word are included, but items not specifically mentioned are not excluded.

Throughout the specification the word "comprising," or variations such as "comprises" or "comprising," will be understood to imply the inclusion of a stated element, integer or step, or group of elements, integers, or steps, but not the exclusion of any other element, integer or step, or group of elements, integers or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only", and the like in connection with the recitation of claim elements, or the use of a "negative" limitation.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

The subject matter described herein includes a traffic marker illumination device designed to attach to traffic markers (e.g., traffic barrels). In some embodiments, the present invention includes a traffic marker illumination system including a plurality of traffic marker illumination devices. Each traffic marker illumination device is designed to attach to the interior of a corresponding traffic marker and to illuminate the traffic marker. Advantageously, each traffic marker illumination device, using at least one sensor, is designed to capture temperature data, positioning data, optical data, and movement data and the traffic marker illumination system is operable to adjust the lighting of each traffic marker illumination device based on the collected sensor data.

As shown in FIG. 1, traffic barrels are used as markers for construction sites, highway assistance, and other dangerous situations. The traffic barrel includes a base 102 attached to a vertical hollow body 104.

Figure 2:
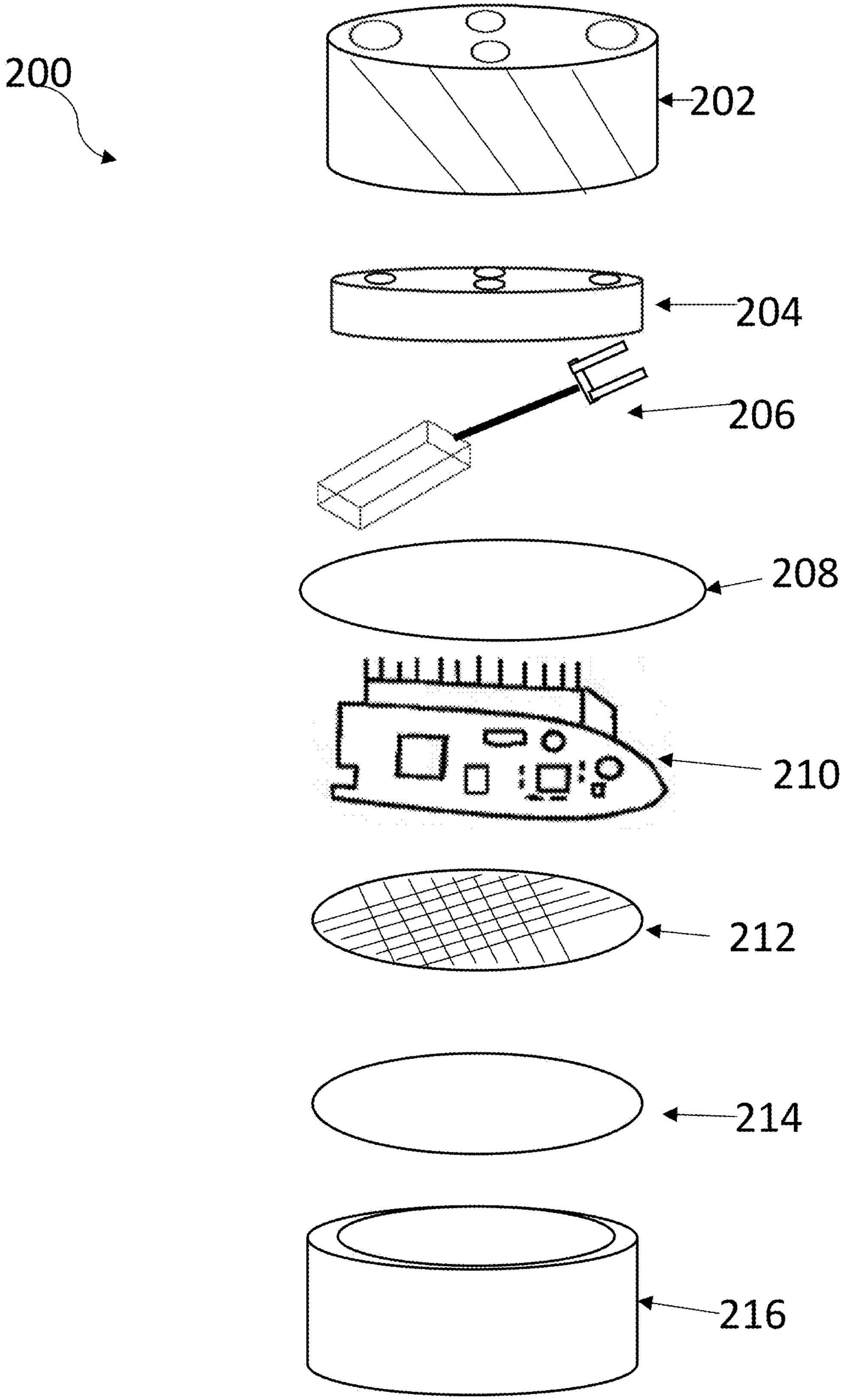
FIG. 2 illustrates an exploded view of a traffic marker illumination device according to one embodiment of the present invention.

FIG. 2 illustrates an exploded view of a traffic marker illumination device 200 according to one embodiment of the present invention. The traffic marker illumination device 200 includes a top shell 202, a magnetic insert 204, a battery 206, a first gasket 208, a printed circuit board assembly 210, a glass lens 212, a second gasket 214, and a bottom shell 216. In some embodiments, the top shell 202 includes an anodized metal material and a plurality of holes desired to receive a plurality of screws. The bottom shell 216 includes an anodized metal material.

In some embodiments, the printed circuit board assembly includes a light generating component. For example, and not limitation, the at least one light generating component includes a light emitting diode (LED) array. In some embodiments, the at least one light generating component is designed to generate a light of about 900 lumens and/or about 1450 lumens. The at least one light generating component is operable to generate a color (e.g., red, blue). In yet another embodiment, the traffic marker illumination device includes a plurality of lights. The traffic marker illumination device is designed to position at least one light in a vertical manner. Advantageously, the at least one light is operable to generate light along the height of a traffic barrel and out of the top of a traffic barrel, thereby improving the visibility of the traffic barrel.

In yet another embodiment, the traffic marker illumination device further includes at least one battery. For example, and not limitation, the at least one battery includes a renewable battery. Alternatively, or additionally, the at least one battery includes a non-renewable battery. In one embodiment, the at least one battery includes a lithium battery (e.g., CR2032). In yet another embodiment, the at least one battery includes a solar power storage component (e.g., solar battery).

In some embodiments, the traffic marker illumination device includes control electronics. The control electronics include a voltage-sensing circuit, an analog-to-digital converter (ADC), a processor, the indicator, and optionally a driver. The voltage sensing circuit can be any standard voltage sensing circuit, such as those found in volt meters. An input voltage VIN is supplied via the power BUS. In one embodiment, the voltage sensing circuit includes standard amplification or de-amplification functions for generating an analog voltage that correlates to the amplitude of the input voltage VIN that is present. The ADC receives the analog voltage from the voltage sensing circuit and performs a standard analog-to-digital conversion.

The processor manages the overall operations of the traffic marker illumination device. The processor is any controller, microcontroller, or microprocessor that is capable of processing program instructions. In one embodiment, the control electronics includes at least one antenna, which enables the traffic marker illumination device to send information (e.g., location, battery level) to at least one remote device (e.g., smartphone, tablet, laptop computer) and/or receive information (e.g., timing commands, power commands) from at least one remote device. The at least one antenna provides wireless communication, standards-based or non-standards-based, by way of example and not limitation, radiofrequency (RF), BLUETOOTH, ZIGBEE, NEAR FIELD COMMUNICATION (NFC), or other similar communication methods.

In some embodiments, the traffic illumination marker device includes a light emitting diode (LED) array with a plurality of mounting holes, a connector port, radial die configuration, and a connector harness. For example, and not limitation, the plurality of mounting holes are used to attach the LED array to the printed circuit board assembly or another component of the traffic marker illumination device. The connector port is operable to receive a male connector of a corresponding cable. The radial die spacing configuration is designed to improve lumen density and beam control. In some embodiments, the LED array includes a heatsink, an adhesive thermal pad, and/or other heat-dissipating component and/or material. In some embodiments, the adhesive thermal pad is mounted to the anodized metal top shell of the traffic marker illumination device. In some embodiments, the LED array further includes a lithium polymer battery pack.

In yet another embodiment, the traffic marker illumination device is designed to charge while attached to another traffic marker illumination device. For example, and not limitation, the traffic marker illumination device is designed to attach to a top of another traffic marker illumination device via a corresponding attachment component (e.g., latch, knob). The traffic marker illumination device further includes a charging port on the bottom of the traffic marker illumination device that is designed to attach to a corresponding connector on the top of the second traffic marker illumination device. Advantageously, this enables the traffic marker illumination devices to charge while in a stacked configuration. In another embodiment, the traffic marker illumination device is designed for wireless charging. For example, and not limitation, in one embodiment, the traffic marker illumination device includes an induction coil and is designed for wireless power transfer.

In some embodiments, the traffic marker illumination device is in network communication with a software platform. The software platform includes a mobile application displayable via a user interface of a remote device. The software platform is in network communication with a remote server. The traffic marker illumination device is operable to receive commands via the software application. The commands include power commands, lighting commands, charging commands, and other commands that affect the operations and function of the traffic marker illumination device.

In some embodiments, the traffic marker illumination device is operable to generate a plurality of light sequences. For example, and not limitation, in some embodiments, a plurality of traffic marker illumination devices are used with a plurality of corresponding traffic markers. The plurality of traffic marker illumination devices is operable to generate a linear, burst, and/or constant strobe light pattern. The light pattern is operable to change in real-time via a command received via wireless communication from a software platform and/or a remote device. The software platform enables a selection of an illumination sequence via a user interface of a remote device. Advantageously, the software platform is further operable for a customized light sequence.

In some embodiments, the illumination sequence is based on positioning and timing data received using a global navigation satellite system (GNSS) and/or based on data received from a remote server (e.g., real-time information from a national weather service). For example, the illumination sequence can be based on sun activity (e.g., sunset and sunrise) of an location of one or more traffic marker illumination devices. Advantageously, the efficiency of one or more traffic marker illumination devices is maximized without monitoring by a user. Alternatively, or additionally, the traffic marker illumination device includes an optical sensor designed to determine the presence and amount of sunlight and is operable to activate/deactivate the traffic marker illumination device based on the presence and amount of sunlight.

The traffic marker illumination device is operable to send alerts to the software platform for real-time and/or on-demand monitoring and configuration. In some embodiments, the traffic marker illumination device is operable to send and receive geographical coordinates (e.g., GNSS, Narrowband Internet of Things (NB-IoT) module), temperature data of the traffic marker illumination device and surrounding environment (e.g., temperature sensor), movement and position data (e.g., accelerometer, gyroscope), service time (e.g., duration of lighting sequence), and remaining battery life. detect drop or kick). For example, and not limitation, the traffic marker illumination device is operable to generate an alert based on a change of position data (e.g., dropped, kicked).

In some embodiments, the traffic marker illumination device is magnetically attached to a traffic marker via a magnetic strip attached to a surface of a traffic marker. For example, and not limitation, a magnetic strip is attached to an exterior surface of a traffic marker via an attachment mechanism (e.g., screws). The traffic marker illumination device is positioned on an interior surface of the traffic marker and is magnetically attached to the magnetic strip.

In some embodiments, the traffic illumination device includes at least one extendable arm component. For example, and not limitation, in some embodiments, the at least one extendable arm component is positioned on or recessed within an exterior surface of the traffic marker illumination device. The extendable arm component is designed to extend away from the device until comes into contact with a traffic marker and to maintain contact even receiving a command to retract or being physically removed from the traffic marker.

In some embodiments, the traffic marker illumination device includes a timing component. For example, and not limitation, the timing component includes a switch, a knob, and other manual methods of setting an activation period. For further example, and not limitation, the timing component includes a plurality of notches corresponding to a time period (e.g., days, hours (8 hours, 10 hours, 12 hours), or minutes). During the activation period, the lighting component is configured to illuminate the traffic marker. Advantageously, the timing component enables workers to set the traffic marker illumination device to run for the duration of work hours and/or daylight hours without requiring the worker to manually turn the lighting component off after the end of work hours.

Figure 3A:
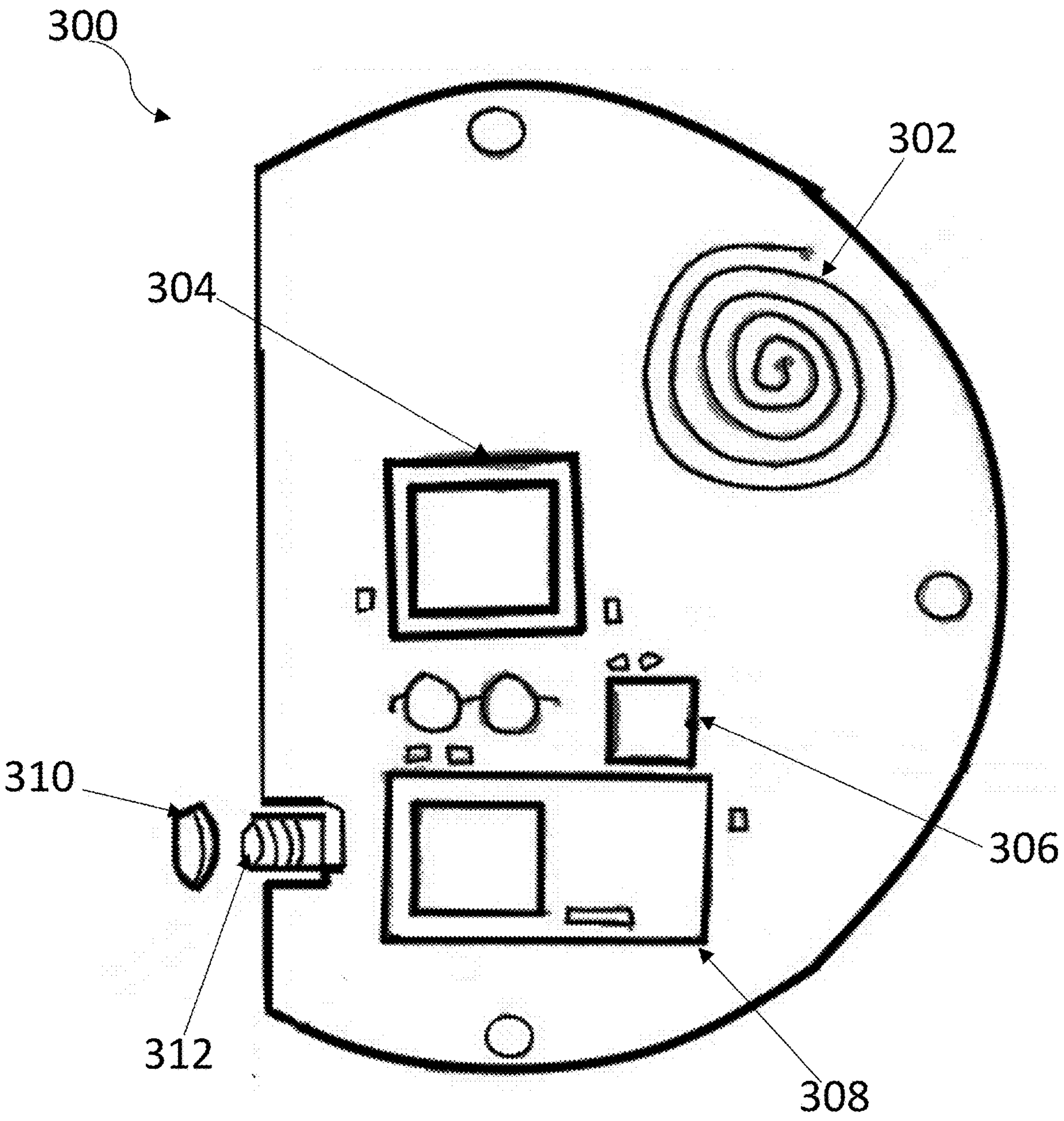
FIG. 3A illustrates a bottom view of a printed circuit board assembly of a traffic marker illumination device according to one embodiment of the present invention.
Figure 3B:
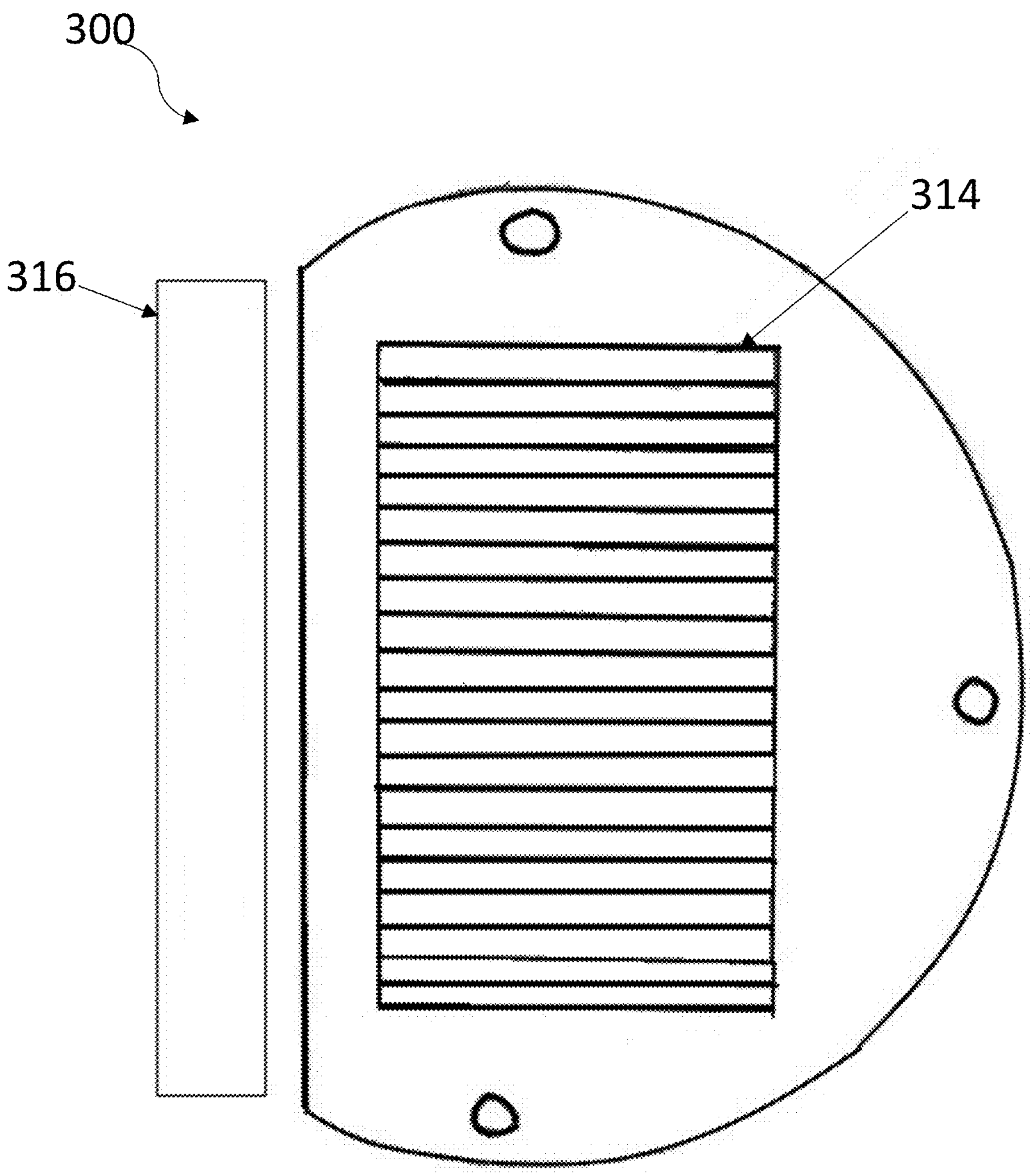
FIG. 3B illustrates a top view of a printed circuit board assembly of a traffic marker illumination device according to one embodiment of the present invention.

FIG. 3A illustrates a bottom view of a printed circuit board assembly of a traffic marker illumination device according to one embodiment of the present invention. The printed circuit board assembly 300 includes a wireless charging coil 302, a light emitting diode array 304, a microcontroller unit (MCU) 306, a wireless module 308, a gasket 310, and a subminiature version A connector 312. As shown in FIG. 3B, in some embodiments, the printed circuit board assembly 300 of the traffic marker illumination device includes a thermal management component 314 and at least one battery 316. For example, and not limitation, the thermal management component 314 includes a thermal pad, a heatsink, and/or a heat-dissipating material. In some embodiments, the at least one battery includes a plurality of batteries. For further example, in some embodiments, the at least one battery includes a lithium polymer battery.

In some embodiments, the traffic marker illumination device is operable to receive a power supply cable (e.g., a Universal Serial Bus (USB) cable) to charge the traffic marker illumination device via a charging port positioned on or recessed within an exterior surface of the traffic marker illumination device. In some embodiments, for example and not limitation, the traffic marker illumination device includes an attachment component. The attachment component includes, but is not limited to, a notch, a handle, and other similar attachment components for inserting and removing the traffic marker illumination device from the bottom of a traffic barrel. For further example, and not limitation, in one embodiment, the handle is designed to receive pressure to slide the traffic marker illumination device into the base of a traffic marker.

Figure 4:
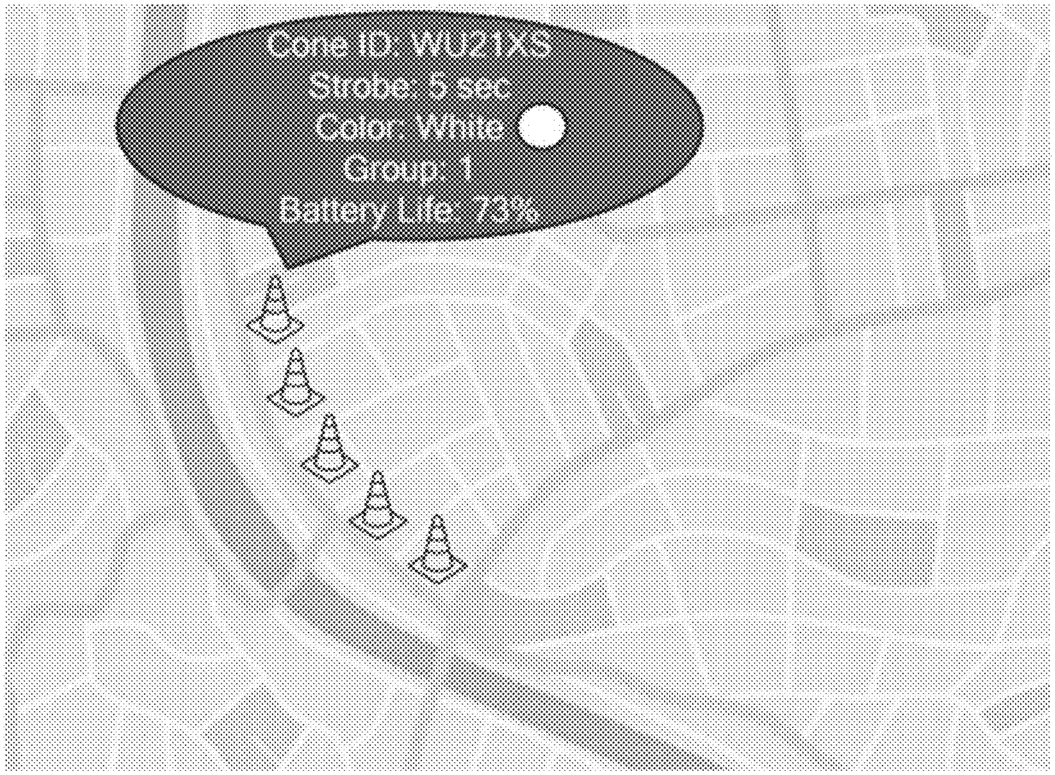
FIG. 4 illustrates a screenshot of a user interface of a software platform of a traffic marker illumination device according to one embodiment of the present invention.

In some embodiments, the traffic marker illumination device includes a Near-Field Communication (NFC) tag with a unique identifier. The traffic marker illumination device is further operable for network communication with a remote server including a software platform. Utilizing the near-field communication tag, the traffic marker illumination device is pairable with a user account of the software platform. As shown in FIG. 4, the unique identifier, the lighting sequence (e.g., strobe color,) and battery life of the traffic marker illumination device is displayable via a user interface of a remote device. Advantageously, using the NFC tag and the software platform, the traffic marker illumination device is operable to be paired and synchronized with one or more other traffic marker illumination devices. This enables the lighting sequence of the grouped traffic marker illumination devices to be paired and provides real-time monitoring and tracking of groups of traffic marker illumination devices.

Figure 5:
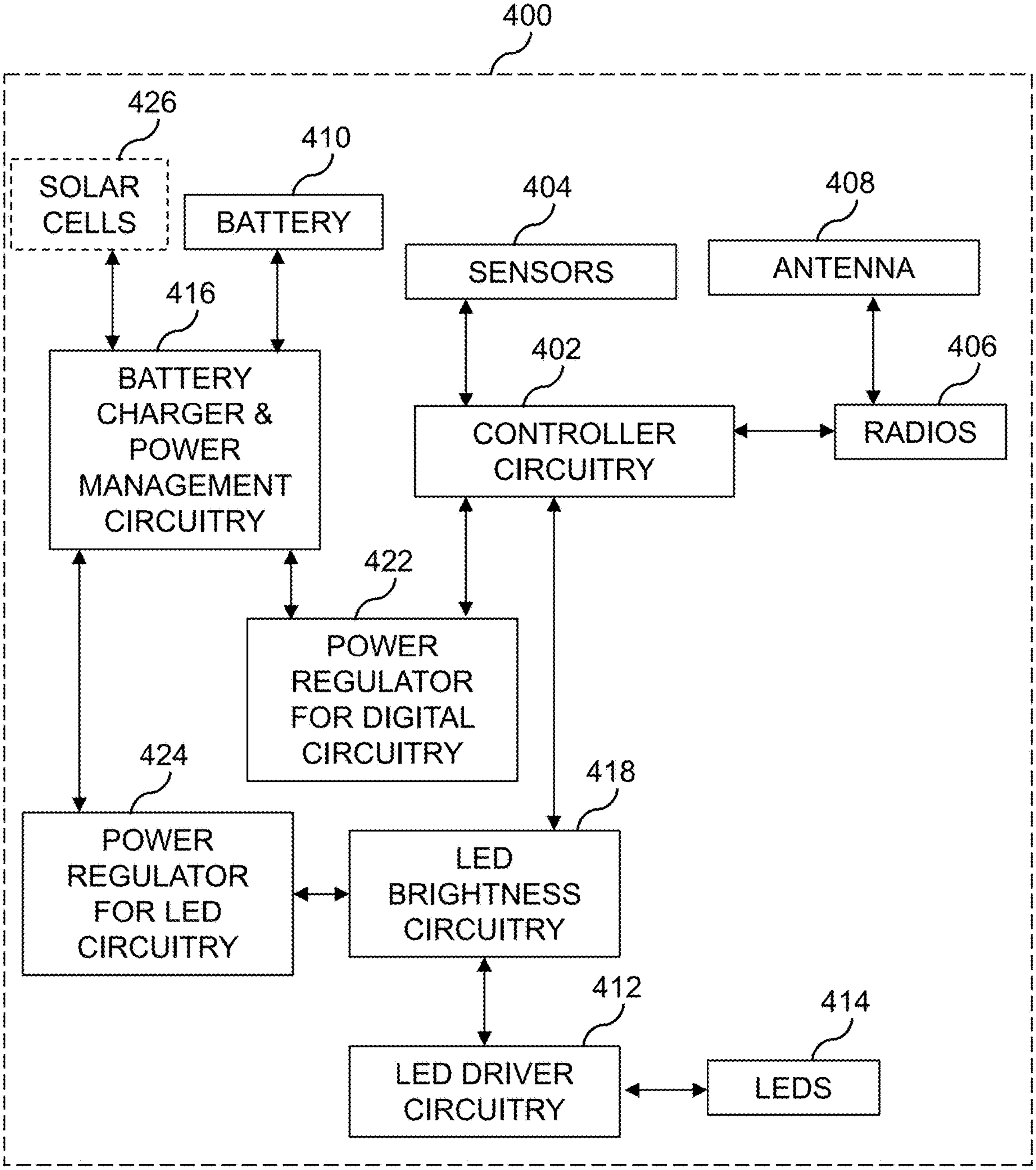
FIG. 5 illustrates a circuitry diagram of a traffic marker illumination device according to one embodiment of the present invention.

FIG. 5 depicts a block diagram illustrating the traffic marker illumination device 400 in accordance with embodiments of the present disclosure. The block diagram includes controller circuitry 402 electrically coupled with sensors 404, and radios 406. The controller circuitry 402 may include a TI CC13x0 processor or the like.

The radios 406 may include DASH7 technologies, Zigbee technologies, Bluetooth technologies, Wi-Fi, Sigfox, DSRC, low-power wide area network (WAN) technologies, and/or the like. The low-power WAN technologies may include LoRaWAN technologies. In further embodiments, the radios may include Wide-band Direct Sequence Spread Spectrum (WBDSSS) technologies. The WBDSS technologies may be configured to operate within a frequency spectrum of approximately 902 to 928 mega-Hertz. The radios 406 are electrically coupled to at least one antenna 408.

The controller circuitry 402 is also electrically coupled with LED brightness circuitry 418. The LED brightness circuitry is electrically coupled with LED drive circuitry 412. The LED drive circuitry 412 is electrically coupled with a plurality of LEDs 414. The block diagram also includes a battery charger and power management circuitry 416. The solar cells 426 and the battery 410 are electrically coupled with the battery charger and power management circuitry 416. A power regulator 422 (for digital circuitry) is electrically coupled between the battery charger and power management circuitry 416 and the controller circuitry 402. A power regulator 424 (for LED circuitry) is electrically coupled between the LED brightness circuitry 418 and the battery charger and power management circuitry 416.

In certain example embodiments, the battery 410 is electrically coupled to one or more solar panels. In one embodiment, the solar panel is attached to the traffic marker illumination device. In yet another embodiment, the solar panel is in a wired connection with the traffic marker illumination device. The battery 410 can be configured to receive electrical energy generated by the solar panel for the purposes of recharging the battery 410 and store the power via solar cells 426. The traffic marker illumination device 400 can also include one or more solar panels. The solar cells 426 can be electrically coupled to the battery 410. In addition, the solar cells 426 can be electrically coupled to the one or more processors, and the lighting component. In this manner, the one or more solar cells 426 may be able to simultaneously power the one or more processors and the lighting component and while also recharging the battery 410.

In one example embodiment, the solar panel is about 10 centimeters by about 10 centimeter polycrystalline/monocrystalline solar panel. However, other shapes, sizes, and types of solar panels may be used in accordance with the example embodiment of the disclosure. For example, it may be beneficial to maximize the upper surface area of the solar panel to generate as much solar energy as possible.

The traffic marker illumination device comprises a durable material (e.g., rubber, resin, plastic), a heat-resistant material, and a water-resistant material. Advantageously, the traffic marker illumination device is designed to withstand environmental factors (e.g., heat, wind, and rain).

In another embodiment, the present invention is configured for network communication. Advantageously, the traffic marker illumination device is configured to receive commands via at least one remote device via network communication. For example, and not limitation, the wireless commands include powering on, powering off, activating the at least one light, and setting a time duration.

In yet another embodiment, the traffic marker illumination device is designed for a traffic control system. The traffic control system comprises a plurality of traffic marker illumination devices positioned along a roadway with a plurality of traffic markers. For example, and not limitation, the roadway has a plurality of lanes. Each traffic marker illumination device is coupled or removably coupled to a traffic marker.

In yet another embodiment, the traffic markers can be positioned between each lane of the plurality of lanes and in at least one lane of the plurality of lanes. In another example embodiment, each traffic marker illumination device includes a global positioning system (GPS) transceiver that can provide an exact position for the traffic marker illumination device along the roadway. Advantageously, this enables tracking of the traffic markers to make sure the traffic markers are in a proper position to indicate danger, workers, and other similar situations. Yet another advantage of the present invention includes tracking the location of the traffic marker to determine whether a traffic marker has been stolen.

In another embodiment, the present invention includes a traffic marker illumination device system comprising a local traffic marker illumination device system and a global traffic marker illumination device system. For example, and not limitation, the local traffic marker illumination device system is designed for control over a plurality of traffic marker illumination devices for a specific location. The specific location includes a construction site, a predetermined stretch of a road, a parking lot, and other environments including traffic markers. The plurality of traffic markers illumination devices is in network communication with at least one remote device (e.g., cellphone). The plurality of traffic marker illumination devices is operable to receive commands from the at least one remote device. The at least one remote device is further designed to provide real-time updates on the traffic marker illumination device. For example, and not limitation, the at least one remote device is designed to display a power level, a location, a light setting, a timer setting, and a lock setting corresponding to at least one traffic marker illumination device. The global traffic marker illumination control system is designed to monitor and control multiple pluralities of traffic marker illumination devices positioned in various geographic locations. For example, and not limitation, the global traffic system includes all traffic marker illumination devices in a country, city, and/or state. The global traffic marker illumination system can send and receive data and instructions to multiple traffic marker illumination systems simultaneously or substantially simultaneously.

Figure 6:
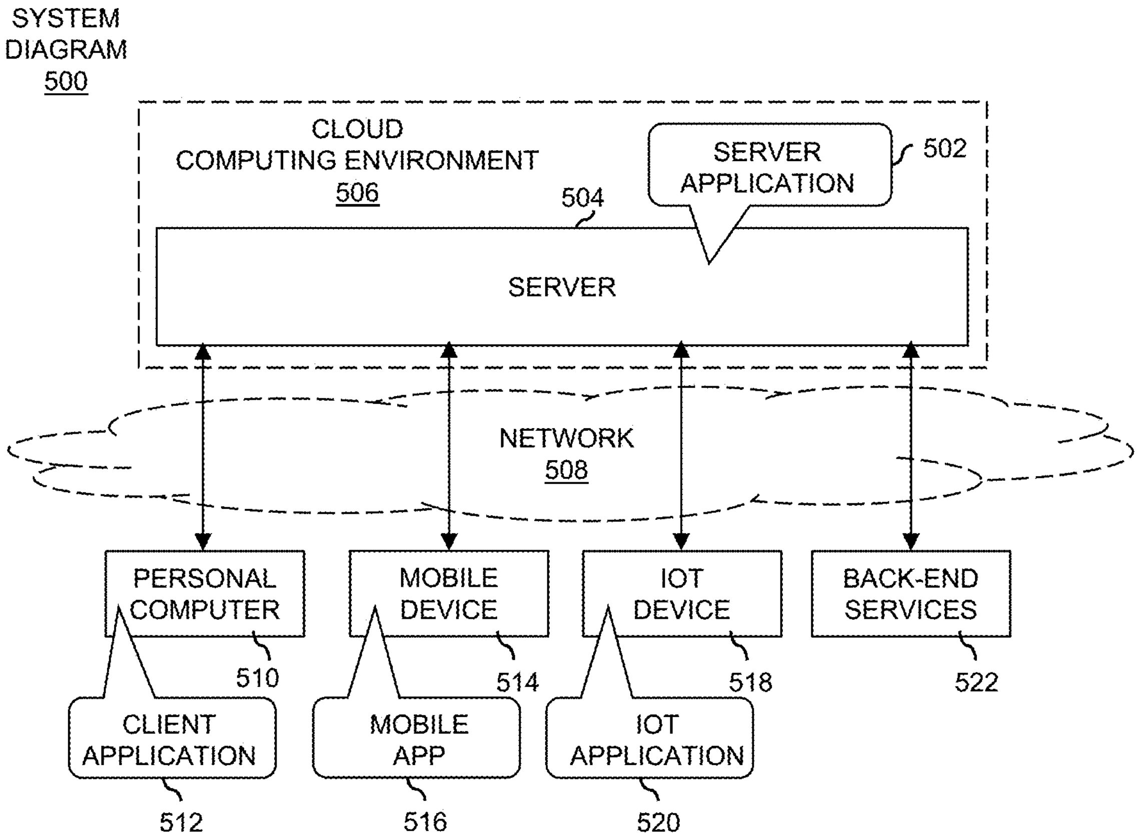
FIG. 6 illustrates a schematic diagram of a traffic marker illumination system according to one embodiment of the present invention.

FIG. 6 depicts a system diagram 500 illustrating a client/server architecture in accordance with embodiments of the present disclosure. The server application 502 is configured to provide a video application and mobile application for at least one traffic marker illumination device. A server application 502 is hosted on a remote server 504 within a cloud computing environment 506. The server application 502 is provided on a non-transitory computer-readable medium including a plurality of machine-readable instructions, which when executed by one or more processors of the server 504, are adapted to cause the server 504 to generate the video platform and mobile application.

The server application 502 is configured to communicate over a network 508. In a preferred embodiment, the network 508 is the Internet. In other embodiments, the network 508 may be restricted to a private local area network (LAN) and/or private wide area network (WAN). The network 508 provides connectivity with a plurality of client devices including a personal computer 510 hosting a client application 512, a mobile device 514 hosting a mobile app 516. The network 508 also provides connectivity for an Internet-Of-Things (IoT) device 518 hosting an IoT application 520 and to back-end services 522.

Figure 7:
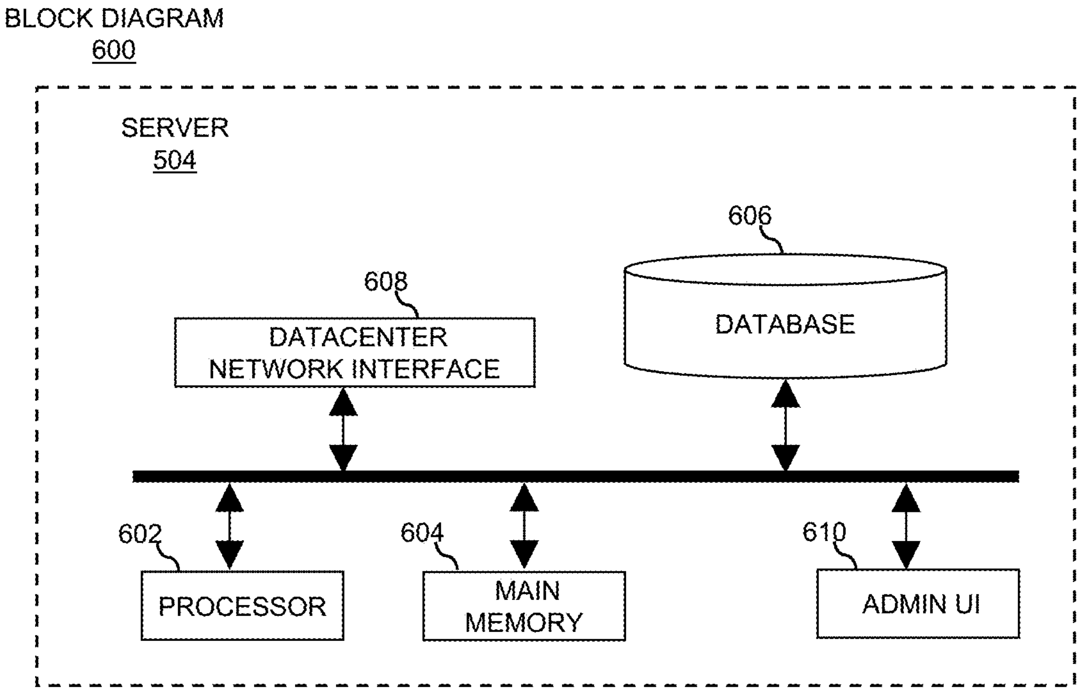
FIG. 7 illustrates a schematic diagram of a traffic marker illumination system according to one embodiment of the present invention.

FIG. 7 depicts a block diagram 600 of the server 504 of FIG. 6 for hosting at least a portion of the server application 502 of FIG. 6 in accordance with embodiments of the present disclosure. The server 504 may be any of the hardware servers referenced in this disclosure. The server 504 may include at least one of a processor 602, a main memory 604, a database 606, a datacenter network interface 608, and an administration user interface (UI) 610. The server 504 may be configured to host one or more virtualized servers. For example, the virtual server may be an Ubuntu® server or the like. The server 504 may also be configured to host a virtual container. For example, the virtual server may be the DOCKER® virtual server or the like. In some embodiments, the virtual server and or virtual container may be distributed over a plurality of hardware servers using hypervisor technology.

The processor 602 may be a multi-core server class processor suitable for hardware virtualization. The processor 602 may support at least a 64-bit architecture and a single instruction multiple data (SIMD) instruction set. The memory 604 may include a combination of volatile memory (e.g., random access memory) and non-volatile memory (e.g., flash memory). The database 606 may include one or more hard drives.

The datacenter network interface 608 may provide one or more high-speed communication ports to the data center switches, routers, and/or network storage appliances. The datacenter network interface may include high-speed optical Ethernet, InfiniBand (IB), Internet Small Computer System Interface iSCSI, and/or Fibre Channel interfaces. The administration UI may support local and/or remote configuration of the server by a data center administrator.

Figure 8:
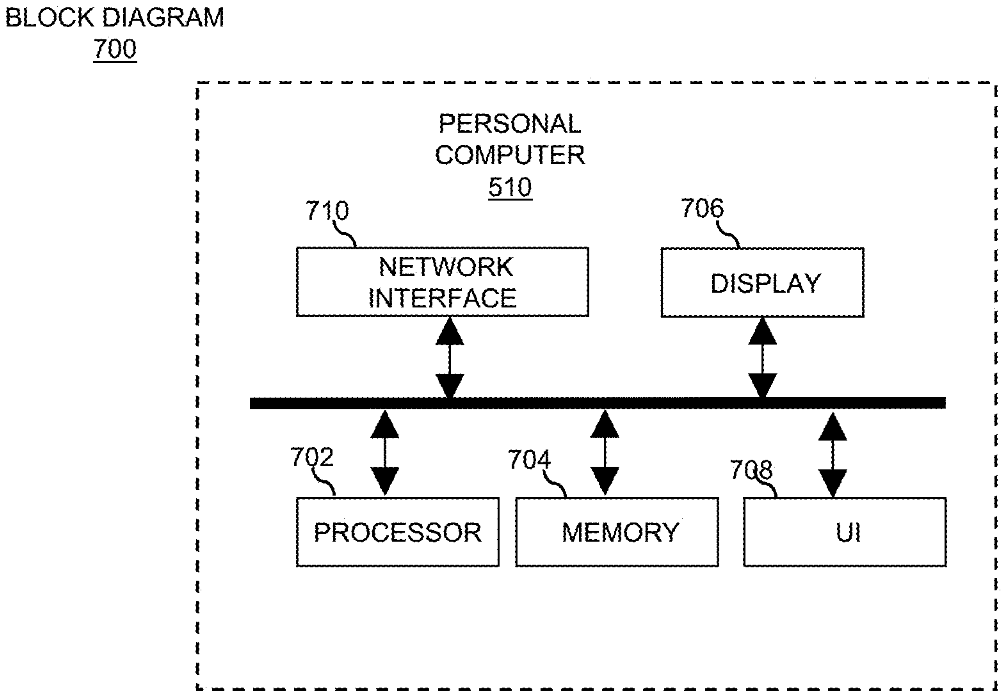
FIG. 8 illustrates a schematic diagram of a personal computer according to one embodiment of the present invention.

FIG. 8 depicts a block diagram 700 of the personal computer 510 of FIG. 6 in accordance with embodiments of the present disclosure. The personal computer 510 may be any of the devices referenced in this disclosure. The personal computer 510 may include at least a processor 702, a memory 704, a display 706, a user interface (UI) 708, and a network interface 710. The personal computer 510 may include an operating system to run a web browser and/or the client application 512 shown in FIG. 6. The operating system (OS) may be a Windows® OS, a Macintosh® OS, or a Linux® OS. The memory 704 may include a combination of volatile memory (e.g., random access memory) and non-volatile memory (e.g., solid state drive and/or hard drives).

The network interface 710 may be a wired Ethernet interface or a Wi-Fi interface. The personal computer 510 may be configured to access remote memory (e.g., network storage and/or cloud storage) via the network interface 710. The UI 708 may include a keyboard, and a pointing device (e.g., mouse). The display 706 may be an external display (e.g., computer monitor) or internal display (e.g., laptop). In some embodiments, the personal computer 510 may be a smart TV. In other embodiments, the display 706 may include a holographic projector.

Figure 9:
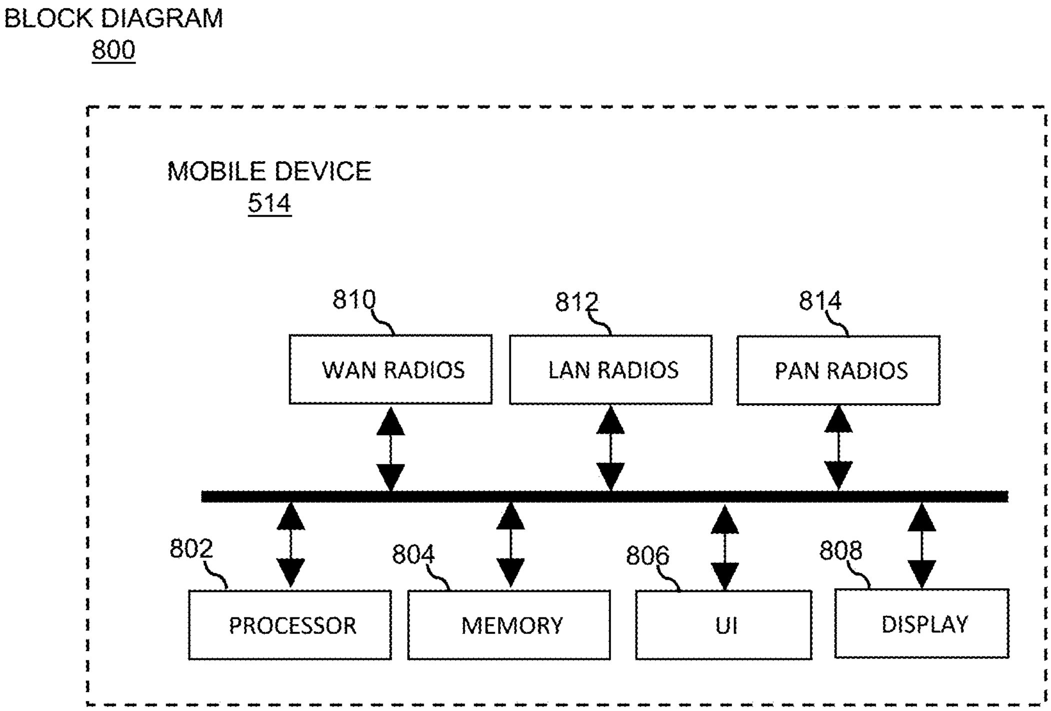
FIG. 9 illustrates a schematic diagram of a mobile device of a traffic marker illumination system according to one embodiment of the present invention.

FIG. 9 depicts a block diagram 800 of the mobile device 514 of FIG. 6 in accordance with embodiments of the present disclosure. The mobile device 514 may be any of the remote devices referenced in this disclosure. The mobile device 514 may include an operating system to run a web browser and/or the mobile app 516 shown in FIG. 6. The mobile device 514 may include at least a processor 802, a memory 804, a UI 806, a display 808, WAN radios 810, LAN radios 812, and personal area network (PAN) radios 814. In some embodiments the mobile device 514 may be an iPhone® or an iPad®, using iOS® as an OS. In other embodiments, the mobile device 514 may be a mobile terminal including Android® OS, BlackBerry® OS, Chrome® OS, Windows Phone® OS, or the like.

In some embodiments, the processor 802 may be a mobile processor such as the Qualcomm® Snapdragon™ mobile processor. The memory 804 may include a combination of volatile memory (e.g., random access memory) and non-volatile memory (e.g., flash memory). The memory 804 may be partially integrated with the processor 802. The UI 806 and display 808 may be integrated such as a touchpad display. The WAN radios 810 may include 2G, 3G, 4G, and/or 5G technologies. The LAN radios 812 may include Wi-Fi technologies such as 802.11a, 802.11b/g/n, and/or 802.11ac circuitry. The PAN radios 814 may include Bluetooth® technologies.

Figure 10:
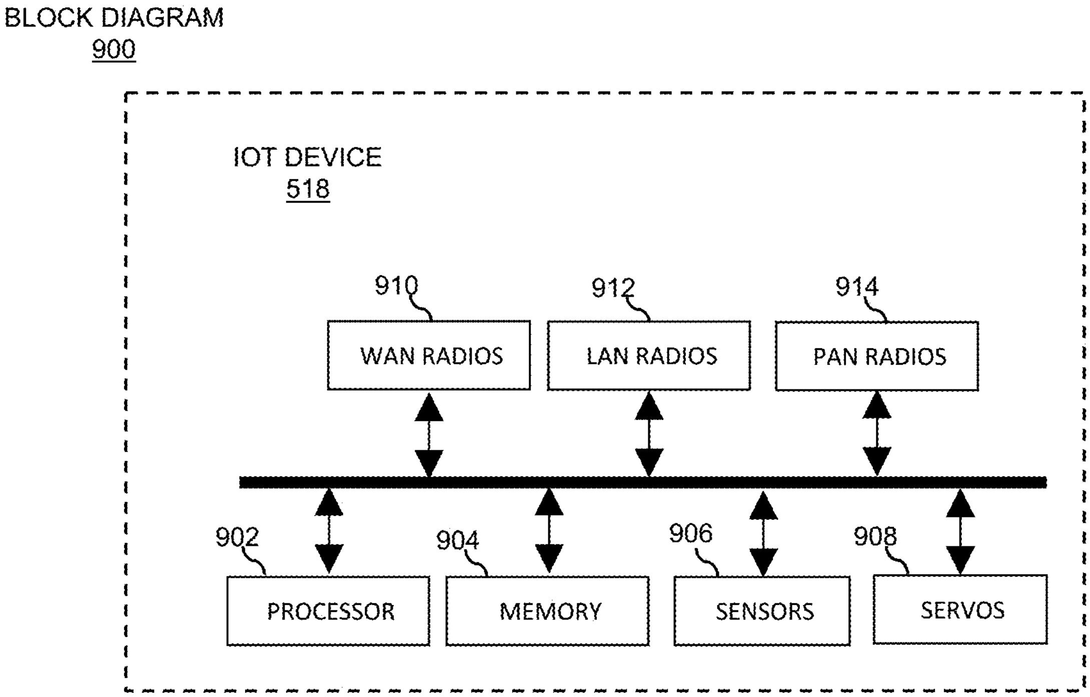
FIG. 10 illustrates a schematic diagram of an internet-of-things (IoT) device according to one embodiment of the present invention.

FIG. 10 depicts a block diagram 900 of the IoT device 518 of FIG. 6 in accordance with embodiments of the present disclosure. The IoT device 518 may be any of the remote devices referenced in this disclosure. The IoT device 518 includes a processor 902, a memory 904, sensors 906, servos 908, WAN radios 910, LAN radios 912, and PAN radios 914. The processor 902, a memory 904, WAN radios 910, LAN radios 912, and PAN radios 914 may be of similar design to the processor 902, a memory 904, WAN radios 910, LAN radios 912, and PAN radios 914 of the mobile device 514 of FIG. 9. The sensors 906 and servos 908 may include any applicable components related to IoT devices such as a smart traffic marker, construction equipment, or the like.

Any combination of one or more computer-readable medium(s) may be utilized. The computer-readable medium may be a computer readable signal medium or a computer-readable storage medium (including, but not limited to, non-transitory computer-readable storage media). A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C #, Objective-C, Go, Scala, Swift, Kotlin, OCaml, SAS, Tensorflow, CUDA, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

These computer program instructions may be provided to a processor of a general-purpose computer, special purpose computer, or other programmable data processing apparatus to produce a machine, such that the instructions, which execute via the processor of the computer or other programmable data processing apparatus, create an ability for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A traffic marker illumination device for improving the illumination of traffic markers, wherein the traffic marker illumination device comprises:

a top shell;
a bottom shell;
a magnetic insert;
a first gasket;
a second gasket;
at least one battery;
a layer of heat-dissipating material;
a printed circuit board assembly including at least one processor, at least one antenna, and a light emitting component; and
at least one glass lens;
wherein, via the magnetic insert, the traffic marker illumination device is operable to magnetically attach to a corresponding magnet positioned on a traffic marker; and
wherein, via the at least one processor, the light emitting component is operable to generating a light corresponding to a lighting sequence, wherein the lighting sequence is based on a timing schedule and a location of the traffic marker illumination device.

2. The traffic marker illumination device of claim 1, wherein the traffic marker illumination device further comprises at least one sensor, wherein the at least one sensor includes at least one of a temperature sensor, an optical sensor, a global positioning sensor, and/or a movement sensor.

3. The traffic marker illumination device of claim 2, wherein the at least one sensor includes the optical sensor, wherein the optical sensor is designed to detect a presence of sunlight and/or an amount of sunlight, wherein the optical sensor is in network communication with the at least one processor, wherein, based on the presence of sunlight and/or the amount of sunlight, the at least one processor is operable to activate the light emitting component.

4. The traffic marker illumination device of claim 1, wherein the light emitting component includes a plurality of light emitting diodes, wherein the lighting sequence further includes a color of a light generated by the light emitting component.

5. The traffic marker illumination device of claim 1, further comprising a wireless charging coil, wherein the at least one battery is operable to charge via the wireless charging coil.

6. The traffic marker illumination device of claim 1, further comprising at least one solar cell, wherein the at least one solar cell is operable to charge the at least one battery.

7. A traffic marker illumination device for improving the illumination of traffic markers, wherein the traffic marker illumination device comprises:

a top shell;
a bottom shell;
a magnetic layer;
a first gasket;
a second gasket;
at least one battery;
at least one sensor;
a printed circuit board assembly including at least one processor, at least one antenna, and a light emitting component; and
at least one glass lens;
wherein the light emitting component includes a plurality of light emitting diodes;
wherein the magnetic insert is positioned under the top shell;
wherein the first gasket is positioned under the magnetic insert,
wherein the at least one battery and the printed circuit board assembly are positioned below the first gasket;
wherein the glass lens is positioned underneath the printed circuit board assembly;
wherein the second gasket is positioned underneath the printed circuit board assembly; and
wherein the bottom shell is positioned underneath the second gasket.

8. The traffic marker illumination device of claim 7, wherein, via the magnetic insert, the traffic marker illumination device is operable to magnetically attach to a corresponding magnet positioned on a traffic marker.

9. The traffic marker illumination device of claim 7, wherein the traffic marker illumination device is operable to receive at least one command from at least one remote device, wherein the at least one command includes a power command, wherein the power command includes an activation of the traffic marker illumination device or a deactivation of the traffic marker illumination device.

10. The traffic marker illumination device of claim 7, wherein the traffic marker illumination device is operable to receive at least one command from at least one remote device, wherein the at least one command includes a lighting sequence, wherein the lighting sequence includes a timing and a color of a light generated by the light emitting component, wherein the generated light includes at least one of a constant light, a pulsing light, and a strobe light.

11. The traffic marker illumination device of claim 7, wherein the traffic marker illumination device is in network communication with at least one remote device, wherein the at least one sensor includes a movement sensor, wherein the movement sensor is operable to collect position data of the traffic marker illumination device, wherein the movement sensor is operable to generate an alert when the position data indicates that the traffic marker illumination device is flipped or dropped.

12. The traffic marker illumination device of claim 7, wherein the top shell and the bottom shell comprise an anodized metal material.

13. A traffic marker illumination device for improving the illumination of traffic markers, wherein the traffic marker illumination device comprises:

a top shell;
a bottom shell;
a magnetic layer;
a first gasket;
a second gasket;
a plurality of sensors, wherein the plurality of sensors include at least one optical sensor, at least one positioning sensor, and/or at least one temperature sensor;
at least one battery;
a printed circuit board assembly including at least one processor, at least one antenna, and a light emitting component; and
at least one glass lens;
wherein the traffic marker illumination device is operable to attach to an interior surface of a traffic marker; and
wherein, once the traffic marker illumination device is positioned within the traffic marker, the traffic marker illumination device is operable to generate a light via the light emitting component.

14. The traffic marker illumination device of claim 13, wherein the traffic marker illumination device is in network communication with at least one remote device, wherein traffic marker illumination device is operable to receive a lighting schedule, wherein the lighting schedule includes a time and lighting sequence corresponding to a light generated by the light emitting component.

15. The traffic marker illumination device of claim 14, wherein the lighting schedule is updated in real-time based on positioning data captured by the at least one positioning sensor, wherein the lighting schedule includes a sunset time and a sunrise time.

16. The traffic marker illumination device of claim 14, wherein the at least one optical sensor is operable to detect sunlight, wherein based on the detection of sunlight the at least one processor is operable to activate the light emitting component based on lighting schedule.

17. The traffic marker illumination device of claim 13, further comprising a wireless charging coil, wherein the at least one battery is operable to charge via the wireless charging coil.

18. The traffic marker illumination device of claim 13, wherein, via the magnetic insert, the traffic marker illumination device is operable to magnetically attach to a corresponding magnet positioned on a traffic marker.

19. The traffic marker illumination device of claim 13, wherein the traffic marker illumination device further comprises a heatsink, wherein the heatsink is positioned on top of the printed circuit board assembly.

20. The traffic marker illumination device of claim 13, wherein the traffic marker illumination device is operable for network communication with a second traffic marker illumination device, wherein the second traffic marker illumination device is operable to generate a light based on the light generated by the traffic marker illumination device.

* * * * *